United States Patent Office 3,222,197
Patented Dec. 7, 1965

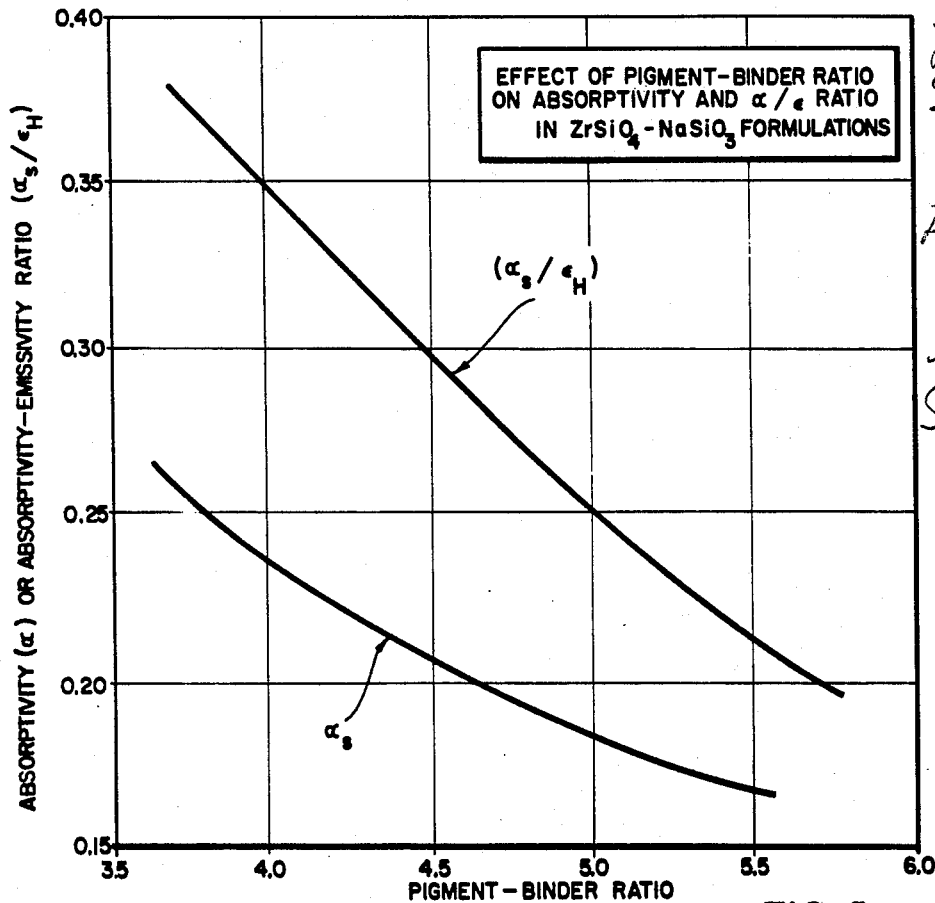
FIG_1
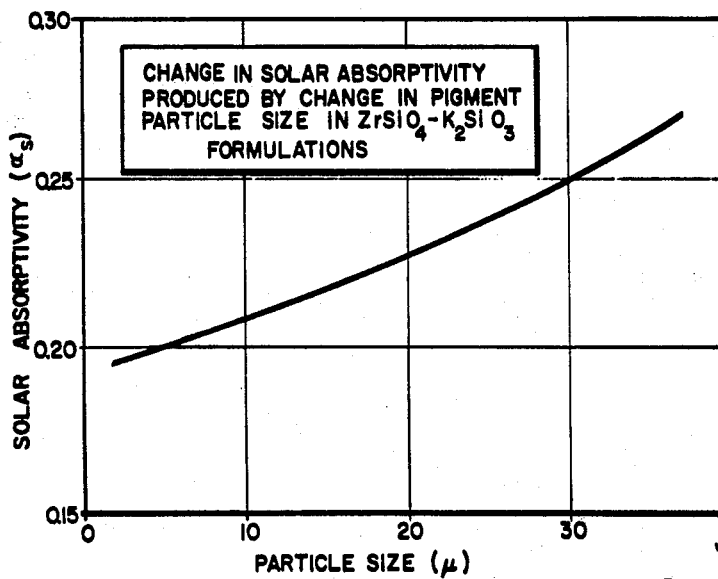
FIG_2
INVENTORS
MERLE E. SIBERT
JAMES TSUKAMOTO
By George A. Sullivan
Agent Dec. 7, 1965  M. E. SIBERT ETAL  3,222,197
INORGANIC SURFACE COATINGS
Filed Jan. 25, 1962  4 Sheets-Sheet 2
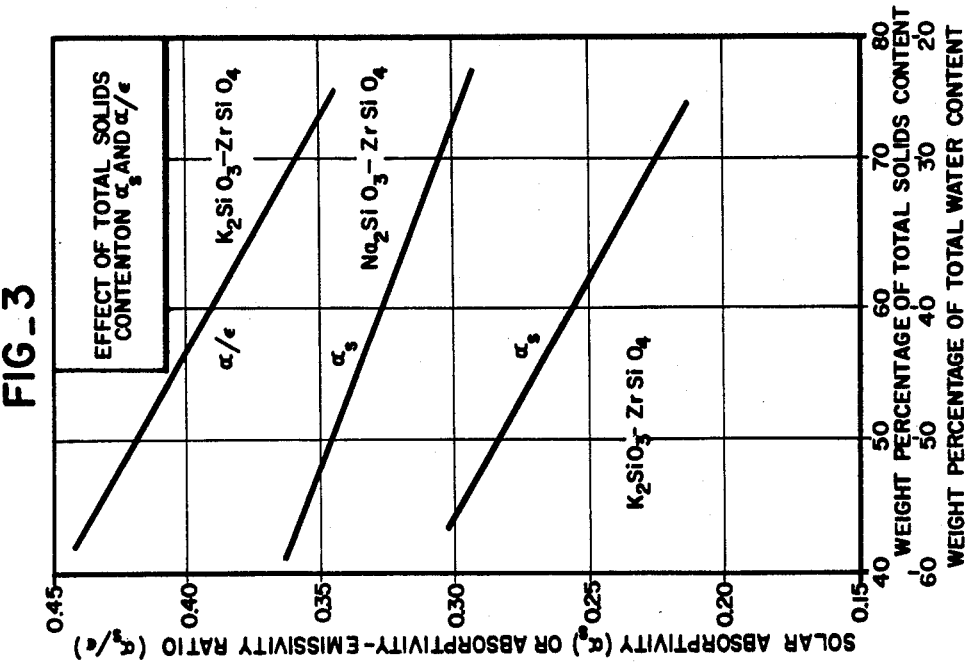
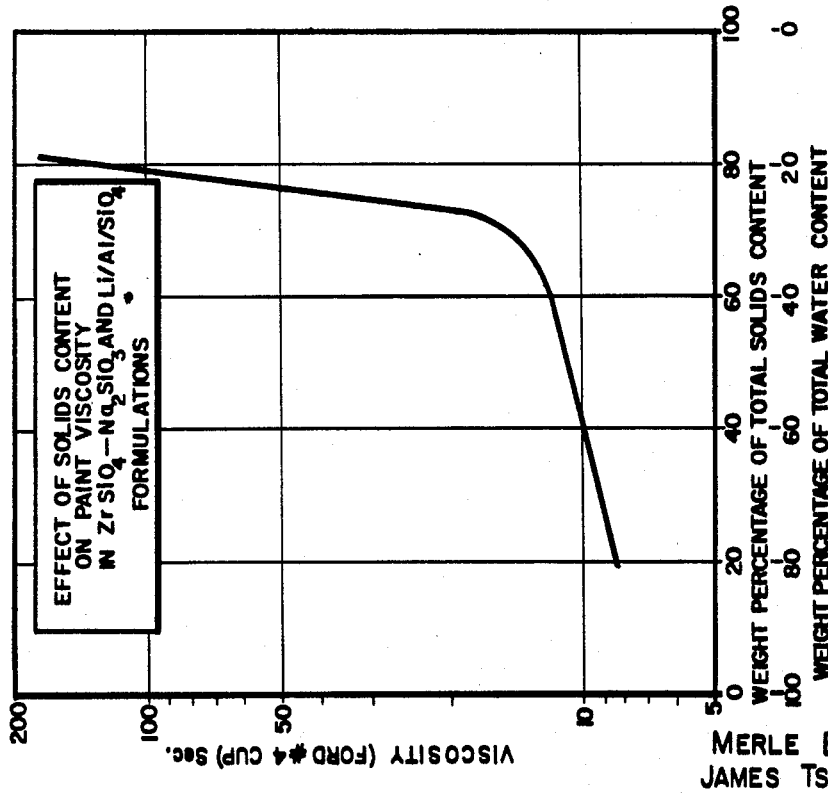
INVENTORS
MERLE E. SIBERT
JAMES TSUKAMOTO
By *George C. Sullivan*
Agent

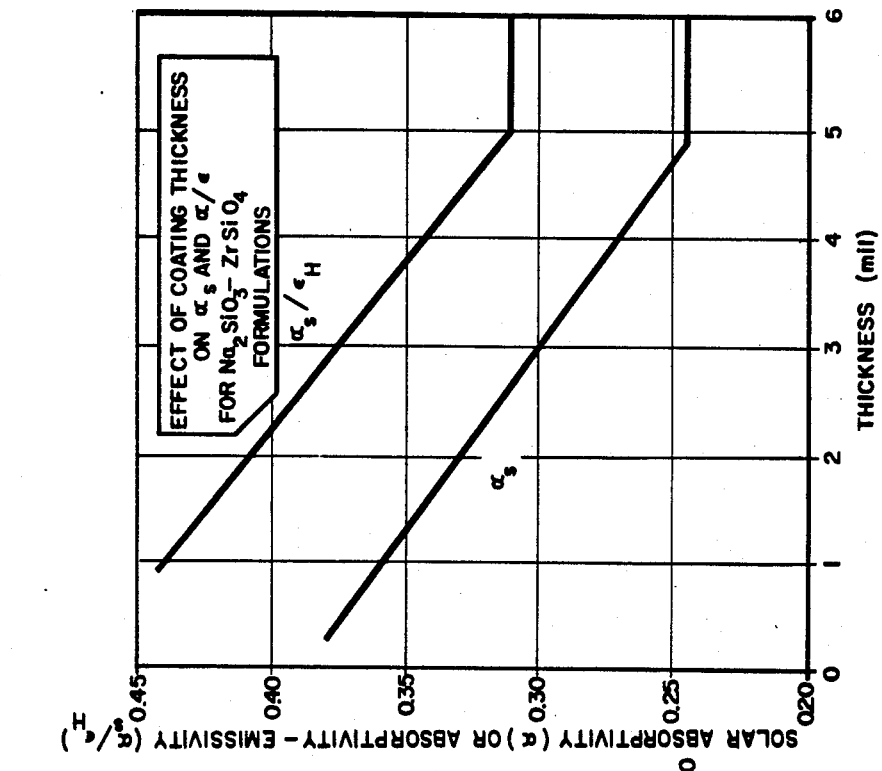
FIG_6
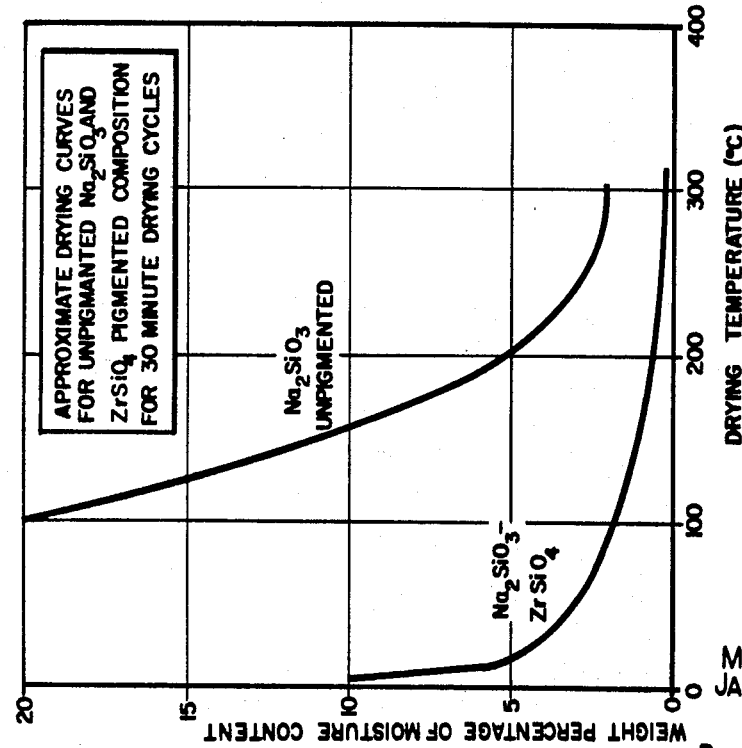
FIG_5
INVENTORS
MERLE E. SIBERT
JAMES TSUKAMOTO
By *George Sullivan*
— Agent

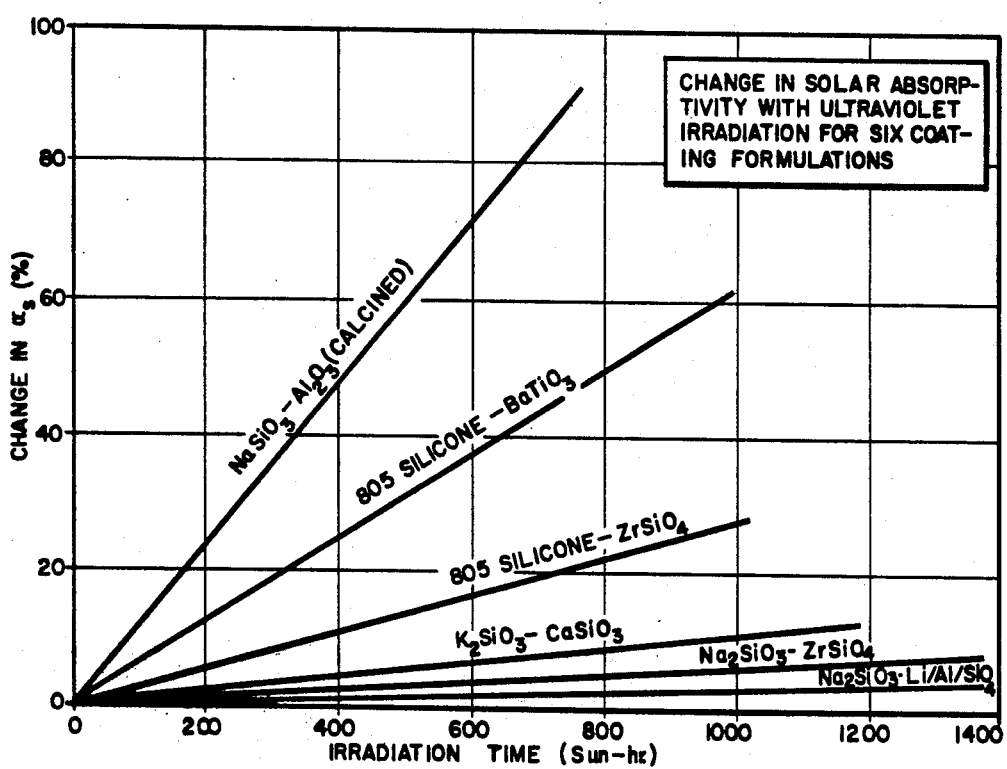
FIG_8
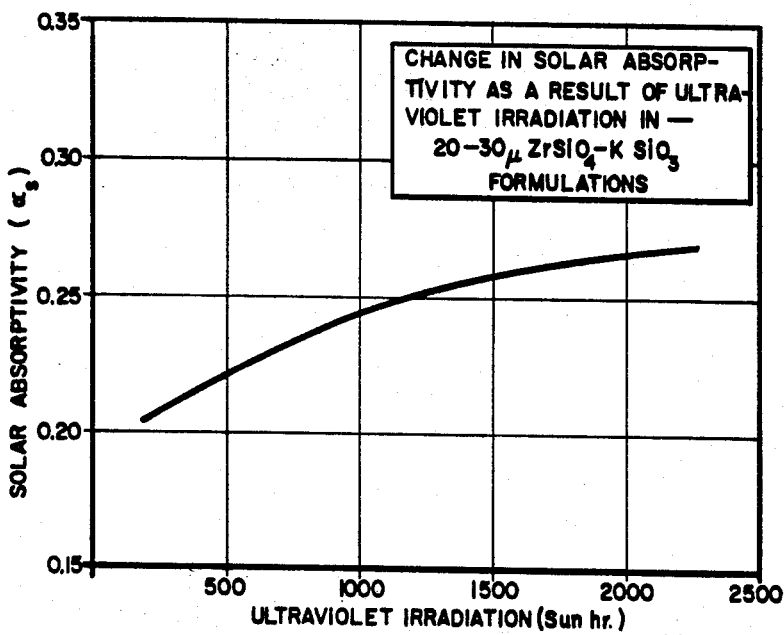
FIG_7
INVENTORS
MERLE E. SIBERT
JAMES TSUKAMOTO

3,222,197
INORGANIC SURFACE COATINGS
Merle E. Sibert, Menlo Park, and James Tsukamoto, Redwood City, Calif., assignors to Lockheed Aircraft Corporation, Burbank, Calif.
Filed Jan. 25, 1962, Ser. No. 168,690
3 Claims. (Cl. 106—84)

The present invention relates to inorganic surface coatings and more particularly to low-solar-absorptivity, passive-thermal-control surfaces suitable for space vehicles.

One of the most critical problems confronting the designers of spacecraft is to develop an environment wherein a relative equilibrium temperature is maintained whereby proper functioning of internal components is insured.

In most space vehicle designs, the craft is initially protected by a surrounding shroud. After the spacecraft reaches the upper atmosphere environment, this protective shroud is ejected, exposing the craft to the space environment. Control of the internal temperature of the spacecraft is, in general, accomplished by provision of conducting paths between the outer surfaces and internal electrical and mechanical gear. Heat is then emitted or absorbed by the outer surfaces through the use of active temperature control devices, passive systems, or, in many instances, combinations of active and passive systems. This invention is concerned primarily with the development of coating systems for use as passive temperature control surfaces.

Coating systems capable of meeting requirements as passive temperature control systems must maintain their structural integrity and chemical stability while retaining essentially constant optical properties over long periods of time while exposed to the environment of space. For present purposes the space environment may be defined as follows: a vacuum of approximately $10^{-12}$ mm. of mercury pressure; temperature ranges of the order of $-65°$ to $140°$ C.; and solar energy of approximately 2 calories per square centimeter per minute, of which about 9% consists of ultraviolet radiation between 2000–4000 A. In addition to the basic conditions of pressure, temperature and radiation, the surface coatings will also be subjected to hypersonic micrometeorite erosion, Van Allen radiation, cosmic radiation, and other factors. Successful spacecraft coatings must retain their coherence, adherence and chemical stability in order to preserve their optical characteristics.

In the past, design criteria for maintaining spacecraft surface temperatures by passive control systems within acceptable limits basically involved the use of a mosaic of materials possessing different thermal radiation characteristics. The area of concern was arranged as a weighted average so that a desirable effective value of solar absorptivity ($\alpha_s$) divided by emissivity ($E_H$) is obtained. In order to maintain suitable temperatures within a spacecraft utilizing passive thermal control surfaces, the solar absorptivity must be less than the solar emissivity otherwise the internal temperature will constantly increase. It is necessary, therefore, that the absorptivity characteristics of the coating be considerably lower than its emissivity characteristics. Consequently, a suitable coating must possess an absorptivity to emissivity ratio, hereinafter designated as $\alpha_s/E_H$, somewhat lower than unity. A large number of factors directly affect the $\alpha_s/E_H$ ratio which include: temperature of the surface, spectral energy distribution incident to the surface, surface cleanliness, surface roughness, angle of incidence of the incoming energy and chemical nature of the particular receiving surface. Typical measured absorptivity and emissivity values for a variety of metallic surfaces are shown in Table I.

TABLE I
Absorptivity-emissivity values

| Material | Surface | $\alpha_s$ | $E_H$ | $\alpha_s/E_H$ |
|---|---|---|---|---|
| Al 2024 | | 0.27 | 0.02 | 13.5 |
| Al 6061 | | 0.41 | 0.04 | 10.3 |
| Au Plate (on Al) | | 0.30 | 0.03 | 10.0 |
| Au (Vac. deposited) | On Al | 0.24 | 0.04 | 6.0 |
| SS 302 | Polished | 0.5 | 0.15 | 3.33 |
| Ni (Electroless) | | 0.45 | 0.17 | 2.6 |
| Mg | Dow 15 | 0.19 | 0.08 | 2.4 |
| Mg | Dow 1 | 0.64 | 0.53 | 1.2 |
| Mg | Dow 10 | 0.89 | 0.85 | 1.05 |
| Mg | Heavy HAE | 0.75 | 0.75 | 1.0 |

From this table it can be seen that metals such as aluminum, gold, stainless steel, nickel and magnesium do not enjoy the requisite low $\alpha_s/E_H$ ratio for passive thermal control surfaces for spacecraft. It is necessary, therefore, that on such metallic surfaces, coatings possessing low $\alpha_s/E_H$ ratios be employed. However, conventional white paints, silicone-base paints, plastic-base paints, phosphate-base formulations and other similar formulations which may have a relatively low $\alpha_s/E_H$ ratio do not possess optical stability after long periods of irradiation in the space environment of high vacuum. Moreover, these prior art coatings do not possess all important physical and chemical stability as evidenced by their tendency to flake or to volatilize in the simulated space environment. It has been found that the formulations of the instant invention overcome the problems that have been faced with conventional paints.

It is the general purpose of this invention, therefore, to provide a thermal control surface possessing the necessary physical, chemical and optical stability to make it highly suitable for such applications as coatings on space vehicles whereby the relatively uniform temperature necessary to protect internal components and occupants is achieved. The present invention is drawn to the discovery of inorganic formulations which possess low absorptance to emittance ratios ($\alpha_s/E_H$) whereby stable temperature control in spacecraft can be achieved and a surface which will not deteriorate over long periods of exposure to a space environment is realized.

An object of the present invention is, therefore, to produce a coating composition which provides thermal equilibrium in spacecraft.

Another object is to provide a coating composition which provides low absorptance to emittance ratios ($\alpha_s/E_H$).

A further object of the present invention is the provision of a coating composition having stable absorptance to emittance ratios.

Another object is to provide a coating composition having stable physical characteristics in a space environment.

Yet another object of the present invention is the provision of a coating composition having stable chemical characteristics in a space environment.

With these and other objects in view as will hereinafter more fully appear and which will be more particularly pointed out in the appended claims, reference is now made to the following description taken in connection with the accompanying figures in which:

FIGURES 1–3 and 6–8 depict the effect of pigment to binder ratio, particle-size, total solid content, thickness, and degree of irradiation on the solar absorptivity of the preferred inorganic surface coatings of the present invention.

FIGURES 4 and 5 set forth in graphical form data which will aid in the preparation of formulations of the coating paints of the instant invention.

In general the coating compositions or paints of the present invention consist of the conventional vehicle and pigment components and, in addition, contain, where necessary, appropriate diluents and additives.

It has been discovered that the vehicle required for the preferred embodiments of the instant invention must be comprised of alkali silicate, the most common examples of which are sodium silicate, potassium silicate and lithium silicate. Alkali silicate materials were discovered to be the most satisfactory vehicles from the standpoint of adherence to a substrate, compatibility with applicable pigment materials, convenience of application and curing procedures required. These vehicles preferably present in an amount from 10 to 30% by weight of composition may range in $M_2O/SiO_2$ ratio from 1/1.80 to 1/3.00 (0.55–0.33) for Na, 0.4 to 0.48 for K, and 0.22–0.28 for Li. Pertinent properties of a number of these alkali silicate vehicles are tabulated in Table II below:

water and is added to adjust the final viscosity to 10–40 sec. (Ford #4 cup). Additives, useful as suspension-dispersion agents and anti-coagulants, are sodium metaphosphate, tungstic acid, and molybdic acid, but are usually not necessary when the formulations are prepared fresh and used immediately.

Representative preferred composition ranges made up of the aforementioned vehicles, pigments, and diluent are set forth below in Table III.

TABLE III

| Silicate vehicle | | Pigment | | Total $H_2O$, W/% | P–V [1] ratio |
|---|---|---|---|---|---|
| Type | $M_2O/SiO_2$ | W/% | Type | W/% | | |
| Na | 0.5 | 15–25 | $ZrSiO_4$ | 55–70 | 15–25 | 4–6 |
| K | 0.3 | 20–30 | $ZrSiO_4$ | 45–64 | 5–25 | 3.5–5.5 |
| Na | 0.5 | 20–30 | $Li/Al/SiO_4$ | 35–55 | 30–40 | 4–6 |
| Na | 0.5 | 15–25 | $CaSiO_3$ | 35–50 | 35–45 | 4–6 |
| Na | 0.5 | 12–25 | $MTiO_3$ [2] / $MZrO_3$ | 40–60 | 25–35 | 4–5.5 |

[1] By volume.  [2] M is alkaline earth metal.

In preparing paints of the above compositions, the recommended procedure is to mix the components in non-contaminating ball mills or colloid mills. Several sequences of steps in performing the mixing operations can be used with equal success. One approach is to first mix the diluent, water, and the vehicle, such as sodium silicate, mill for a period up to 24 hours, add the pigment, and then continue milling for an additional 48 to 72 hours. An alternative approach is to mix initially the diluent,

TABLE II

*Silicate vehicles*

| Type | $M_2OSiO_2$ ratio | $M_2O$, percent by wt. | $SiO_2$, percent by wt. | Solids cont., percent by wt. | $H_2O$ cont., percent by wt. | Sp. Gr. | Viscosity poise |
|---|---|---|---|---|---|---|---|
| Sodium | 0.5 | 14.70 | 29.4 | 44.1 | 55.9 | 1.534 | 9.6 |
| Do | 0.345 | 11.00 | 31.9 | 42.9 | 57.1 | 1.480 | 3.5 |
| Do | 0.31 | 8.90 | 28.7 | 37.6 | 62.4 | 1.394 | 1.8 |
| Do | 0.266 | 6.75 | 25.3 | 32.05 | 67.95 | 1.318 | 2.2 |
| Potassium | 0.397 | 8.30 | 20.8 | 29.1 | 70.9 | 1.239 | 0.4 |
| Do | 0.475 | 12.45 | 26.2 | 38.65 | 61.35 | 1.386 | 10.5 |
| Do | 0.455 | 9.05 | 19.9 | 28.95 | 71.05 | | 0.07 |
| Do | 0.458 | 11.0 | 24.0 | 35.0 | 65.0 | 1.33 | |
| Lithium | 0.219 | 1.85 | 7.039 | 8.889 | 91.111 | 2.215 | |

Inorganic pigments preferred for use in producing suitable formulations are comprised of refractory-metal oxides or double oxides, and refractory silicates. Examples of suitable refractory-metal oxides are $ZrO_2$, $ThO_2$, $Nb_2O_5$ and $Ta_2O_5$ and examples of double oxides are $MgZrO_3$, $SrZrO_3$, $SrTiO_3$ and $MgTiO_3$. Suitable refractory silicates are, for example, $ZrSiO_4$, $CaSiO_3$ and $Li/Al/SiO_4$. Preferred formulations are produced when in the final coating the amount of pigment is from 35 to 70% by weight of composition and the ratio by volume of the pigment to the dried vehicle (or more appropriately called binder) is in the range of 3–6. FIGURE 1 shows the effect of the pigment to binder ratio on absorptivity and absorptivity-emissivity ratio for $ZrSiO_4$–$Na_2SiO_3$ formulations in general. It is seen there that pigment content used in a given formulation strongly influences the absorptivity and absorptivity-emissivity ratio in the resultant thermal control coating; by adding more pigment to a paint formulation and thereby increasing the pigment to binder ratio in the final coating, it is possible to effect a decrease in the absorptivity-emissivity ratio by a factor of 50%.

In the present invention the diluent used is always vehicle, and pigment and then mill for periods up to 96 hours. After these extensive periods of milling, the pigment particles will be thoroughly mixed with the vehicle. As shown graphically in FIGURE 2, pigment particle size has a significant effect on solar absorptivity; the smaller the particles of pigment the lower the absorptivity and the more suitable the paint for use as a thermal control surface. As FIGURE 2 illustrates, it is preferred that milling continue until particles of pigment are uniformly of 40 microns or less.

In determining the percentage of diluent ($H_2O$) to add to the paint to obtain suitable viscosities for facilitating application to the substrate, it is necessary to keep in mind the fact that it is the pigment and dried vehicle (or binder) which are substantially responsible for lowering the absorptivity to emissivity ratio; and that deletion of pigment in effect reduces the total solids content of pigment and binder in a given area. (However, it is important to note from FIGURE 1 that as between pigment and binder the former is the most effective in reducing the absorptivity-emissivity ratio.) Consequently, it is desirable to employ a relatively high total solids content to keep the absorptivity-emissivity-ratio low (see FIGURE 3), while at the same time keeping the total solids content low enough to provide paints with viscosities which will permit ready application to the substrate. In FIGURE 4 the non-linearity of the relationship of total solids content to viscosity in the case of $ZrSiO_4-Na_2SiO_3$ and $Li/Al/SiO_4-Na_2SiO_3$ formulations is evident. And as Table II indicated the water content of the silicate used as a vehicle may vary. Consequently, the water in the alkali silicate must be taken into consideration when determining the total water (or diluent) quantities in any specific formulation. In $ZrSiO_4-Na_2SiO_3$ and $$Li/Al/SiO_4-Na_2SiO_3$$

formulations where the total water content from the water in the sodium silicate and the water purposefully added as a diluent constitute, for example, approximately 60%, the viscosity is approximately 10 Ford #4 cup-sec. as the FIGURE 4 graph shows. It is seen in this graph that when the total water content is less than 30% the viscosity increases to a marked degree; and in view of FIGURE 3 where increasing the total solids content effects a lower absorptivity to emissivity ratio, it is apparent that an optimum point in balancing workable viscosity against lowest possible $\alpha_s/E$ ratio for the $ZrSiO_4-Na_2SiO_3$ formulation is reached at about 70% total solids content. For most applications, therefore, it is preferred that in $ZrSiO_4-Na_2SiO_3$ the total solids content be at about 70% or less. In any case the total solids content should be less than 80% by weight of the composition.

After the paint has been prepared by milling the mixed vehicle, pigment and diluent, the paint is ready for application to the substrate. This step can be accomplished by conventional painting techniques such as dipping, rolling, brushing or spraying. Because of the high degree of control inherent in spraying, it is the preferred method for most applications.

Subsequent drying or curing is effected by air drying or, preferably, heating to temperatures up to a maximum of approximately 400° C. A typical drying cycle is to air dry for 1–3 hours and then furnace dry for 1–3 hours at 300° C. For zirconium-silicate coatings a satisfactory cure is obtained by a 3 step cycle of holding at room temperature for 1 hour, then drying at 100° C. for 1 hour and finally drying at 200° C. for 2 hours. Other exemplary drying cycles are set forth below in Table IV.

formulations is representative of the effect for all formulations within ±1 mil. It is preferable, however, to use multiple coats of 1 to 2 mils to build up to the requisite thickness of 5 mils capable of masking the substrate, as opposed to employing a single coat of 5 mils. Although the use of the paints of the instant invention to coat metallic subsurfaces such as magnesium and aluminium is the principal objective, it is understood that the paint can be applied to wood, Sheetrock, asbestos-based siding material and many other materials where high reflectivity and low absorptivity of electromagnetic energy is desired. A typical use would be painting exterior surfaces of buildings in order to effect maximum reflection of the sun's rays with a minimum of maintenance due to the stability of the paint. Another exemplary use would be for coating reflector surfaces in lighting units whereby the heating effect would be reduced to the advantage of increasing light emission.

The stability of optical properties of the paint formulations herein described has proved highly satisfactory. FIGURE 7 sets forth a curve showing the effect of space simulated conditions of vacuum and solar irradiation on the absorptivity of a typical silicate based coating. The vacuum utilized in evaluating test specimens was approximately $10^{-7}$ Torr and the irradiation source used was a high pressure mercury, argon-filled lamp operating at 1,000 watts with an output of 65,000 lumens consisting of a continuous spectrum with superimposed lines. The spectral energy curve for this lamp compares favorably with the known solar curve. This particular coating exhibits a 20–25% change in solar absorptivity after 1500 to 2000 hours of irradiation. At about 1800 to 2000 sun hours, it is evident from FIGURE 7 that the absorptivity has become essentially constant. Other formulations such as the all silicate composition of $Na_2SiO_3-Li/Al/SiO_4$ have exhibited changes in absorptivity as low as 5% as can be seen in FIGURE 8. This graph illustrates the superiority of the compositions of the present invention over some of the silicone and aluminum based compositions of the prior art.

In general, the physical and chemical properties of the formulaitons provided herein are excellent as applied over

TABLE IV

| Vehicle | Pigment | Time at Temp. ° C. | | | | | |
|---|---|---|---|---|---|---|---|
| | | RT | 75 | 100 | 150 | 200 | 300 |
| | | Min. | Min. | Min. | Min. | Min. | Min. |
| $Na_2SiO_3$ | $ZrSiO_4$ | 0.5 | | 0.5 | | 0.5 | 0.5 |
| $K_2SiO_3$ | $ZrSiO_4$ | 1.0 | | | | 0.5 | 0.5 |
| $Na_2SiO_3$ | $ZrSiO_4-CaSiO_3$ | 1.0 | 2.0 | | | 2.0 | |
| $K_2SiO_3$ | $CaSiO_3$ | 1.0 | 1.0 | 1.0 | | 2.0 | |
| $Na_2SiO_3$ | $ZrSiO_4$ | 8.8 | 1.0 | 1.0 | 2.0 | | |

FIGURE 5 graphically portrays the effect of temperatures during a 30 minute cycle on the moisture content of a cured coating of $Na_2SiO_3-ZrSiO_4$. After 30 minutes at 300° C. the residual water is of a negligible quantity. The curve in FIGURE 5 was obtained by drying samples at 25, 50, 100, 200 and 300° C. for 30 minutes after which the samples were weighed for weight loss. Subsequent drying at 400° C. to a constant weight gave the percentage of weight lost in the first heating. The difference between the upper curve in FIGURE 3 and the lower curve vividly portrays how the presence of pigmentation in sodium silicate substantially increases water removal characteristics of a formulation.

The thickness of the coating layed down on the substrate is not a critical factor after a thickness of 5 mils. FIGURE 6, which demonstrates this feature for $$Na_2SiO_3-ZrSiO_4$$

pure aluminum and other substrates. In thermal shock tests, panels heated to 100° C. have been quenched in Dry Ice-isopropyl alcohol baths (approximately −70° C.) without damage to the applied coating. Silicate-based coated specimens have also survived severe vibration tests running up to 10,000 cycles. Bend tests have also been made on coated panels using ¾" to ½" mandrels wherein the coatings withstood test bends up to 180° with the result that some crazing is evident but no actual exfoliation occurs. Salt spray tests were run on representative zircon-silicate coated magnesium panels. These tests, which were carried out for 24 hours' duration at 35° C. in a chamber containing 20% salt and 100% relative humidity, indicated substantial corrosion resistance in salt air.

The preparation, application and properties of formulations of this invention having been described in general terms, specific formulations will now be set forth:

TABLE V

| Alkali silicate $M_2O:SiO_2 \cdot x[H_2O]$ | | | | | Pigment | | Diluent $H_2O$, percent by wt. | Total, percent $H_2O$ | Viscosity, #4 Ford cup (sec.) |
|---|---|---|---|---|---|---|---|---|---|
| Type | $M_2O:SiO_2$ ratio | Percent solids by wt. | Percent $H_2O$ by wt. | Total wt. percent | Type | Percent by wt. | | | |
| Na | 0.5 | 8.5 | 10.8 | 19.3 | $Zr_2SiO_4$ | 6..1 | 18.6 | 29.4 | 17 |
| Na | 0.5 | 8.5 | 10.8 | 19.3 | $ZrSiO_4$ | 63.5 | 17.2 | 28.0 | |
| Na | 0.5 | 7.5 | 9.6 | 17.1 | $ZrSiO_4$ / $Ba(OH)_2$ / $Al_2O_3$ | 50.3 / 2.8 / 2.3 | 27.4 | 37.0 | 13 |
| Na | 0.5 | 6.8 | 8.7 | 15.5 | $ZrSiO_4$ / Microcel C | 45.9 / 2.5 | 36.1 | 44.8 | 15 |
| Na | 0.5 | 8.4 | 10.7 | 19.1 | $CaSiO_3$ | 38.9 | 42.0 | 52.7 | (1) |
| Na | 0.5 | 11.2 | 14.3 | 25.5 | $Li/Al/SiO_4$ | 43.1 | 31.4 | 45.7 | 17 |
| Na | 0.5 | 11.2 | 14.3 | 25.5 | $Li/Al/SiO_4$ | 43.1 | 31.4 | 45.7 | 15 |
| Na | 0.5 | 10.5 | 13.4 | 23.9 | $Li/Al/SiO_4$ | 40.4 | 35.7 | 49.1 | 16 |
| Na | 0.5 | 10.1 | 12.8 | 22.9 | $Li/Al/SiO_4$ / $ZrSiO_4$ | 31.4 / 13.5 | 32.2 | 45.0 | 17 |
| K | 0.455 | 6.9 | 16.8 | 23.7 | $ZrSiO_4$ | 49.1 | 27.2 | 44.0 | 17 |
| K | 0.290 | 8.6 | 21.1 | 29.7 | $ZrSiO_4$ | 63.3 | 7.0 | 28.1 | 17 |
| K | 0.255 | 7.2 | 17.6 | 24.8 | $ZrSiO_4$ | 49.8 | 25.4 | 43.0 | 14 |
| K | 0.290 | 5.4 | 13.3 | 18.7 | $ZrSiO_4$ / $CaSiO_3$ / Microcel C | 28.2 / 11.7 / 0.6 | 40.8 | 54.1 | 15 |
| K | 0.455 | 10.7 | 26.2 | 36.9 | $Li/Al/SiO_4$ / $ZrSiO_4$ | 30.7 / 19.6 | 12.8 | 39.0 | 21 |

[1] Thixotropic.

EXAMPLE I

A vehicle comprised of 19.3 percent by weight of $Na_2SiO_3$ of which 10.8% by weight is represented by $H_2O$ is mixed with 62.1 percent by weight of $Zr_2SiO_4$ and 18.6 percent by weight of $H_2O$ as a diluent. This mixture is placed in a ball mill and milled continuously for 60 hours. The resultant paint is sprayed onto a pure aluminum sheet to a thickness of 2 mils whereupon the thus coated sheet is cured by heating at 300° C. for three hours. Spraying and curing is then twice repeated to produce a final coat of approximately 6 mils thick. After the surface so produced is exposed for over 200 sun hours in a simulated space irradiation environment, a change in absorptivity of less than 10% results. The absorptivity to emissivity ratio in the final irradiated surface is 0.18.

EXAMPLE II

A vehicle of 23.7 percent by weight of $K_2SiO_3$, wherein the water content represents 16.8 percent by weight, is mixed with 49.1 percent by weight of $ZrSiO_4$ and 27.2 percent by weight of $H_2O$. The thus formed mixture is milled for 90 hours in a ball mill giving a homogeneous particle size of from 10–20 microns. A substrate of pure alumina is sprayed to a thickness of 2 mils and subsequently cured by holding at room temperature for 1 hour, drying at 100° C. for 1 hour and finally drying at 200° C. for 2 hours. Multiple coats are then sprayed on and cured according to the same cycle until a thickness of approximately 6 mils is produced. An initial absorptivity of approximately 0.15 is obtained with this coating and after 2000 sun hours of simulated space irradiation this absorptivity increased by less than 20%.

Various modifications are contemplated and may obviously be resorted to by those skilled in the art without departing from the spirit and scope of this invention, as hereinafter defined by the appended claims, as only preferred embodiments thereof have been disclosed.

We claim:
1. A high reflectivity, low absorptivity, inorganic surface paint having an absorptivity to emissivity ratio of less than unity consisting of:
    (a) 10 to 30% by weight of a lithium silicate vehicle wherein the $Li_2O$ to $SiO_2$ ratio is 0.22 to 0.28,
    (b) 35 to 70% by weight of a pigment having a maximum particle size of 40 microns selected from the group consisting of refractory metal oxide, refractory metal double oxide and refractory silicate, the ratio by volume of said pigment to dried vehicle being from 3 to 6, and
    (c) A diluent consisting of water of sufficient quantity to produce a total solids content of less than 80% by weight.

2. An inorganic paint consisting of:

| | Percent by weight |
|---|---|
| $Na_2SiO_3$ | 20–30 |
| $Li/Al/SiO_2$ | 35–55 |
| $H_2O$ | 30–40 |

3. An inorganic paint consisting of:

| | Percent by weight |
|---|---|
| $Na_2SiO_3$ | 12–25 |
| $SrTiO_3$ | 20–30 |
| $SrZrO_3$ | 20–30 |
| $H_2O$ | 25–35 |

References Cited by the Examiner

UNITED STATES PATENTS

| | | | |
|---|---|---|---|
| 1,618,288 | 2/1927 | Kinzie | 106—300 |
| 1,762,581 | 6/1930 | Nicolson | 117—223 |
| 1,924,311 | 8/1933 | Frey | 106—84 X |
| 2,214,815 | 9/1940 | Hanahan et al. | 106—300 |
| 2,765,237 | 10/1956 | Drummond | 106—84 |
| 2,807,552 | 9/1957 | Robinson et al. | 106—74 |
| 2,991,200 | 7/1961 | Sheridan et al. | 106—84 X |
| 2,998,328 | 8/1961 | Munger et al. | 106—84 |
| 3,102,038 | 8/1963 | Fisher | 106—84 |

FOREIGN PATENTS 859,620  1/1961  Great Britain.

OTHER REFERENCES

"The Condensed Chemical Dictionary," Rose et al., Reinhold Publishing Corp., New York, 1961, 6th Edition, page 1229.

TOBIAS E. LEVOW, *Primary Examiner.*

JOSEPH REBOLD, *Examiner.*